United States Patent
Daumüller et al.

[11] Patent Number: 5,913,601
[45] Date of Patent: Jun. 22, 1999

[54] HEADLIGHT FOR VEHICLE

[75] Inventors: Hans Daumüller, Bodelshausen, Germany; Friedrich Schauwecker, Ann Arbor, Mich.

[73] Assignee: Robert Bosch GmbH, Stuttgart, Germany

[21] Appl. No.: 08/745,259

[22] Filed: Nov. 8, 1996

[51] Int. Cl.⁶ ............................................ B60Q 1/06
[52] U.S. Cl. ........................ 362/463; 362/514; 362/524
[58] Field of Search .................... 362/460, 462, 362/463, 514, 515, 423, 428

[56] References Cited

U.S. PATENT DOCUMENTS

| | | | |
|---|---|---|---|
| 5,068,769 | 11/1991 | Umeda et al. | 362/61 |
| 5,343,372 | 8/1994 | Shirai et al. | 362/66 |
| 5,683,163 | 11/1997 | Goldschmidt et al. | 362/66 |

Primary Examiner—Stephen Husar
Attorney, Agent, or Firm—Michael J. Striker

[57] ABSTRACT

A headlight for a vehicle has a reflector, a holder on which the reflector is adjustably supported, an adjusting device for adjustment of the reflector, the adjusting device including an adjusting screw which is rotatable about its longitudinal axis and which is non-displaceable in direction of the longitudinal axis, an indicating device which indicates a deviation of an adjustment of the reflector from a prescribed position, the indicating device having an indicating element which is screwable in a threaded shaft of the adjusting screw, the indicating element being non-rotatable but displaceable in direction of the longitudinal axis of the adjusting screw, the indicating element having a springy, expandable threaded shell which is open over a part of its periphery and provided with an inner thread, the indicating element being premounted on a part of the holder in a position which is separate from the adjusting screw and so that a threaded connection of the indicating element with the adjusting screw is performed by pressing the threaded shell transversely to the longitudinal axis of the adjusting screw on the threaded shaft.

6 Claims, 2 Drawing Sheets

HEADLIGHT FOR VEHICLE

BACKGROUND OF THE INVENTION

The present invention relates to headlights for vehicles.

More particularly, it relates to a headlight with a reflector adjustably mounted on a holder and provided with an adjusting device.

Headlights of the above mentioned general type are known in the art. One of such headlights is disclosed for example in U.S. Pat No. 5,068,769. The adjusting device for adjusting the reflector which is arranged displaceably on the holder is provided in this reference with an adjusting screw. The adjusting screw is rotatably arranged on the holder but is not displaceable in direction of its longitudinal axis. Moreover, the headlight has an indicating device with an indicating element which is screwed on a threaded shaft of the adjusting screw and guided non-displaceably. The indicating element indicates a deviation of the adjustment of the reflector from a prescribed deviation. A scale is arranged on the outer side of the holder as a part of the indicating device, and the indicating element is provided with a marking cooperating with the scale. During mounting of the headlight the reflector is brought to its prescribed adjusted position, and in this adjusted position the indicating element and the scale are adjusted relative to one another to indicate the prescribed adjustment of the reflector. In order to allow this operation, the scale is movable on the holder in direction of the longitudinal axis of the adjusting screw and fixable by a clamping screw after the obtained adjustment. Alternatively, the indicating element can be composed of two parts and include one part which is screwable on the threaded shaft and another part which is fixable on it after the obtained adjustment by a clamping screw. Both embodiments lead to high manufacturing costs of the headlight, since additionally the clamping screws for fixing the scale or the indicating element are needed after the obtained adjustment. Also, the mounting of the clamping screws and their tightening requires a certain time, which naturally must be avoided in the interests of an efficient mounting.

SUMMARY OF THE INVENTION

Accordingly, it is an object of the present invention to provide a headlight of the above mentioned general type, which avoids the disadvantages of the prior art.

In keeping with these objects and with others which will become apparent hereinafter, one feature of the present invention resides, briefly stated in a headlight for a vehicle, in which the indicating element has a springy, expandable threaded shell which is open on a part of its periphery and provided with an inner thread, the indicating element in a position separate from the adjusting screw is pre-mounted on a part of the holder, and the threaded connection of the indicating element with the adjusting screw is produced by pressing the threaded shell transversely to the longitudinal axis of the adjusting screw on its threaded shaft.

When the headlight is designed in accordance with the present invention, it has the advantage that after the performed adjustment it suffices to press the indicating element in a simple manner only with its threaded shell onto the threaded shaft of the adjusting screw. During the mounting of the headlight the reflector is brought to its prescribed position by turning of the adjusting screw, and the indicating element is located in its pre-mounted position in which it is separate from the adjusting screw. The indicating element can be brought, independently from the adjusting screw, to its position which indicates the prescribed adjustment of the reflector, and in this position its threaded shell is pressed onto the threaded shaft of the adjusting screw.

In accordance with a further advantageous feature of the present invention, the indicating element in its pre-mounted position is blocked in direction of the longitudinal axis of the adjusting screw so that the indicating device indicates the prescribed adjustment of the reflector, and in its position in which the threaded connection with the adjusting screw is obtained, is displaceable in direction of the longitudinal axis. When the headlight is designed in accordance with these features, a further simplification of the mounting and adjustment of the headlight is possible since the indicating element is held in its position indicating the prescribed adjustment of the reflector during the premounting.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
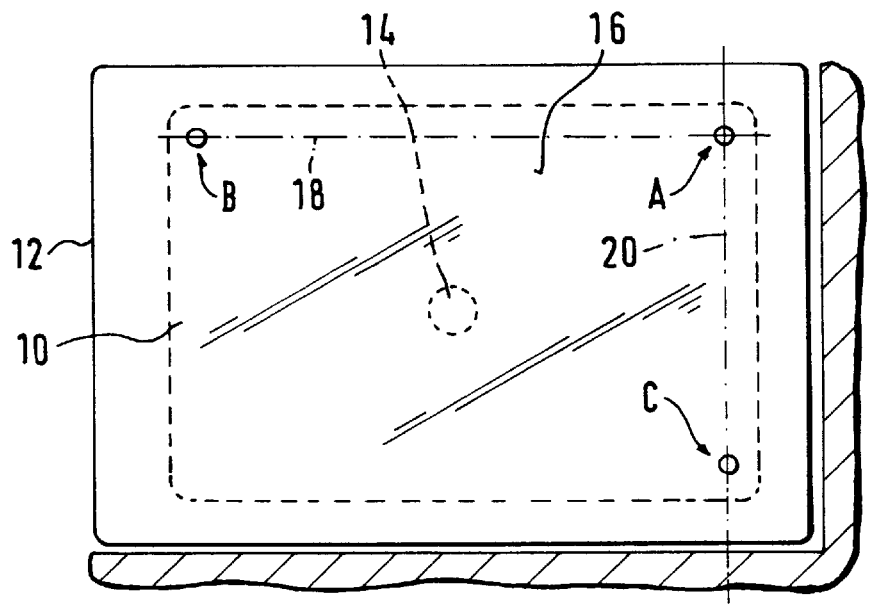
FIG. 1 is a substantially simplified front view of a headlight in accordance with the present invention.

A headlight for a vehicle, in particular for a motor vehicle, shown in FIGS. 1–5 is mounted on a chassis of the vehicle in a not shown manner. The headlight has a reflector 10 which is displaceably supported on a holder 12. A light source 14 is inserted in the reflector 10. The holder 12 is formed as a housing which accommodates the reflector 10. It has a light outlet opening which is closed by a light-permeable cover member formed as a cover disk 16. The reflector 10 is connected with the housing 12 for example in three bearing points A, B and C as shown in FIG. 1. Each two bearing points determine an axis, around which the reflector 10 is turnable. Two bearing points A and B are arranged horizontally near one another and determine a horizontal turning axis 18 of the reflector 10, while two bearing points A and C are arranged vertically over one and another and determine a vertical turning axis 20 for the reflector 10. The bearing point A forms a so-called fixed bearing, on which no adjustment of the reflector 10 is performed. Both other bearing points B and C form so-called adjustment bearings. An adjusting device is associated with the bearing points B and C to change the distance between the reflector 10 and the housing 12 in the region of these bearing points B and C, and to perform a turning movement of the reflector 10 around one of the turning axes 18 or 20. For an adjustment of the reflector 10 in a vertical plane, it is turned by actuation of the adjusting device associated with the bearing point C. For adjustment in a horizontal plane the reflector 10 is turned by actuation of the adjusting device associated with the bearing point B about the vertical turning axis 20.

Figure 2:
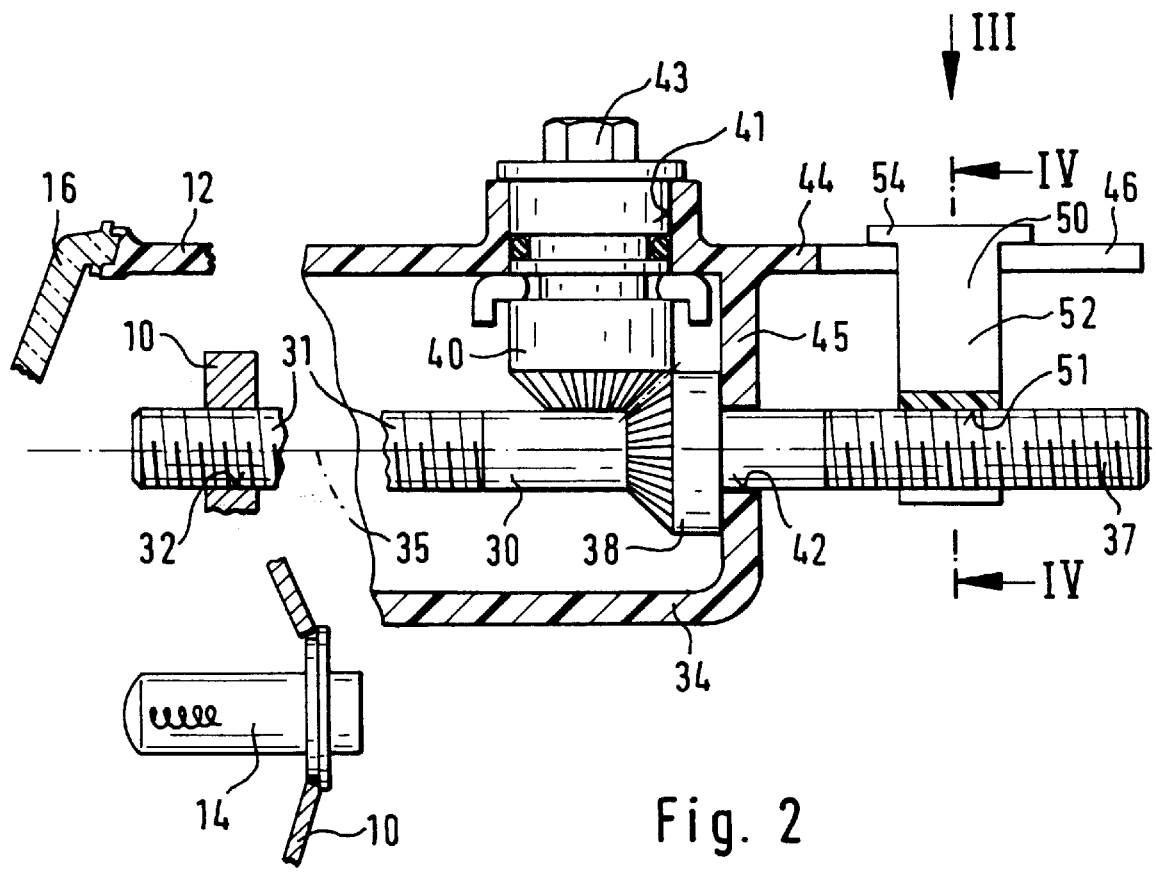
FIG. 2 is a vertical longitudinal section of the inventive headlight.

FIGS. 2–5 show an adjusting device which is associated with at least one of the bearing points B and C, for example at least with the bearing point C for adjustment of the reflector 10 in a horizontal plane. The adjusting device as shown in FIG. 2 has an adjusting screw 30 provided with a front threaded shaft 31 which is screwed in a nut part 32 connected with a reflector 10. A housing part 34 is arranged at the rear side of the housing 12. The end of the adjusting screw 30 which faces away from the reflector 10 extends in the housing part 34 and is supported turnably around the longitudinal axis 35 of the adjusting screw 30. The end of the adjusting screw 30 extends through an opening 42 in a rear wall 45 of the housing part 34 outwardly. The adjusting screw 30 is provided with a further, rear threaded shaft 37 in its end region arranged outside of the housing 34. The threaded shaft 37 can extend to the end of the adjusting screw 30 or not completely to its end. In the region arranged inside the housing part 34, a bevel wheel 38 is arranged on the adjusting screw 30 after its front threaded shaft 31. The bevel teeth of the bevel wheel 38 face toward the reflector 10 and form preferably of one-piece element with the adjusting screw 30. A second bevel wheel 40 engages with the bevel wheel 38 and is arranged perpendicular to the bevel wheel 38. It is rotatably supported in an opening 41 in an upper wall of the housing part 34. The second bevel wheel 40 has an actuating portion 43 arranged outside the housing part 34 and formed to be engaged for turning. The adjusting screw 30 is supported in the housing part 34 rotatably about its longitudinal axis 35. However, in direction of its longitudinal axis 35 it extends through the rear wall 45 of the housing part, against which the rear side of the bevel wheel 38 with no teeth abuts. The second bevel wheel 40 is not displaceable. During turning of the second bevel wheel 40, the adjusting screw 30 is turned through its bevel wheel 38 and thereby via the axial fixing of the adjusting screw 30, the nut part 32 is screwed along the front threaded shaft 31 so that the reflector 10 is turned around the turning axis 20.

Figure 3:
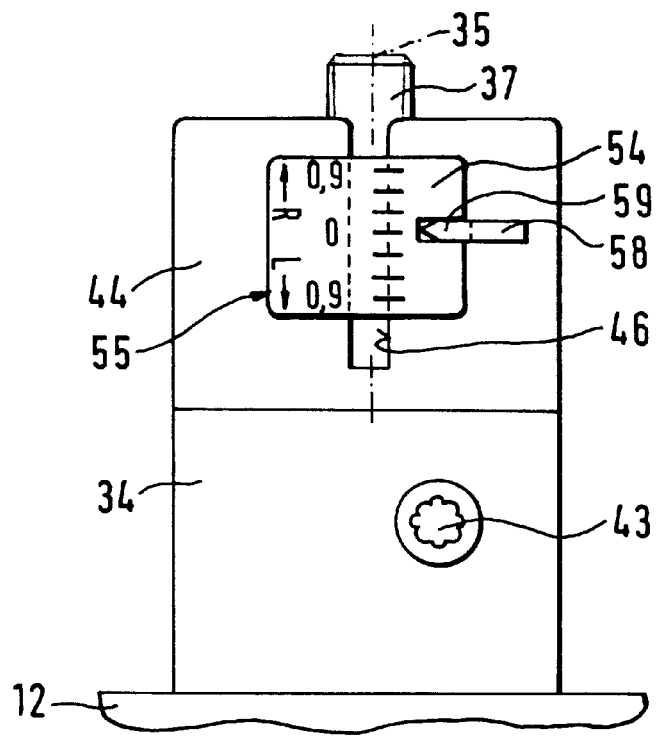
FIG. 3 is a view showing a section of the inventive headlight as seen in direction of the arrow III in FIG. 2.

An upper wall 44 projects from the housing part 34 of the housing 12 through its rear wall 45 outwardly and extends over the rear threaded shaft 37 of the adjusting screw 30. Alternatively, a separate upper wall portion 44 can be connected also with the housing part 34 and extend above the rear threaded shaft 37 of the adjusting screw 30. The wall 44 forms a part of the holder on which the reflector 10 is supported. The upper wall 44, as shown in FIG. 3, has a slot 46 extending in direction of the longitudinal axis of the adjusting screw 30 from the threaded shaft 37. It continuously extends to the end of the wall 44 which faces away from the housing 12.

Figure 4:
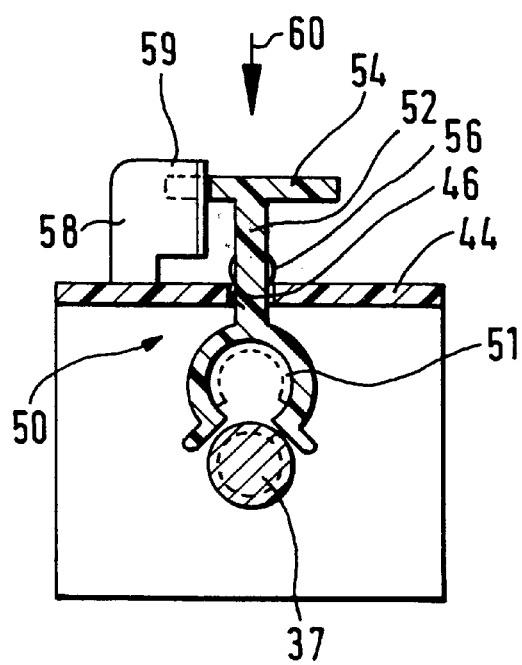
FIG. 4 is a view showing a section of the headlight in a cross-section taken along the line IV—IV in FIG. 2 with an indicating element in a pre-mounted position.
Figure 5:
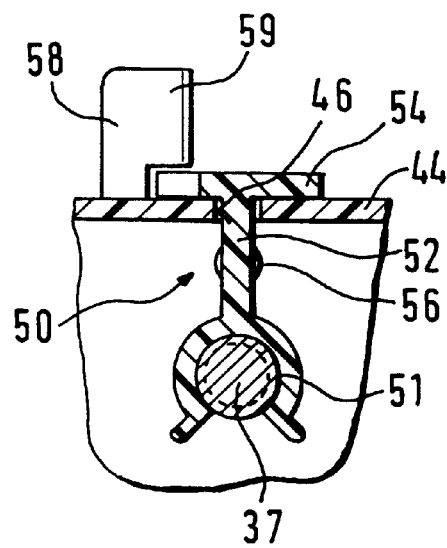
FIG. 5 is a view showing a section with the indicating element in a finally mounted position.

An indicating element 50 which is a part of an indicating device to be described further on in detail, is screwed on the rear threaded shaft 37 of the adjusting screw 30. As shown in FIG. 4, the indicating element 50 has a springy, expandable threaded shell 51 which is open on a part of its periphery and provided with an inner thread. The opening of the threaded shell 51 extends over less than half periphery of the threaded shell. The indicating element 50 also has a head 50 which is formed of one-piece with the threaded shell 51 through a small web 52. The web 52 extends with a small gap transversely to the longitudinal axis 35 through a slot 46, and the head 54 is arranged above the wall 44. The web 52 has a thickening 56 which is somewhat wider than the slot 46 in the wall 44. In a mounted position of the headlight, the indicating element 50 is arranged substantially vertically and the opening of the threaded shell 51 faces downwardly. The indicating element 50 can be composed for example of synthetic plastic and produced by injection molding.

The head 54 on its side facing upwardly is provided with a scale 55 which is stepped in direction of the longitudinal axis 35 of the adjusting screw 30 and has a recess 56 extending on a lateral edge transversely to the longitudinal axis 35. The recess 56 is located preferably opposite to the center of the scale 55 as considered in direction of the longitudinal axis 35. A rib 58 projects from the wall 44 laterally near the slot 46 upwardly. It has a projection 59 facing the slot 46 and provided in its upper end region facing away from the wall 44. The projection 59 is not formed in the region of the rib 58 which is near the wall 44. Therefore the rib 58 extends there less close to the slot 46 than in the upper end region. The region of the rib 58, in which the projection 59 is not formed, is lower than the height of the head 54 of the indicating element 50.

During mounting of the headlight, the indicating element 50 is pre-mounted on the wall 44 which forms a part of the holder of the headlight, in a position which is separate from the adjusting element 30. In other words, it is mounted in a position in which the threaded shell 51 is not in engagement with the rear threaded shaft 37 of the adjustment screw, but instead is arranged above it and underneath the wall 44. In this pre-mounted position the indicating element 50 is shown in FIG. 4. The indicating element 50 is inserted with its web 52 in the slot 46, to such a position in direction of the longitudinal axis 34 of the adjusting screw 30, in which the projection 59 of the rib 58 engages in the recess 56 of the head 54. The thickening 56 of the web 52 engages substantially over the slot 46 laterally outwardly and sits on the upper side of the wall 44. The head 54 is arranged at a distance above the wall 44 in the end region of the rib 58, in which the projection 59 is arranged. The indicating element 50 with the projection 59 as a marking forms together an indicating device which indicates a deviation of the adjustment of the reflector 10 from its prescribed position. The indicating element 50 in the above described pre-mounting condition is located in its position with which it indicates, by the scale 55 arranged on the head 54 in cooperation with the projection 59 of the rib 58 as a marking, that the reflector 10 is located in its prescribed position. During turning of the adjusting screw 30, the reflector 10 can be brought in its prescribed position by an optical measurement, in which the direction of the light beam reflected by the reflector 10 is detected. The indicating element 50 has no connection with the adjusting screw 30, so that it is not displaced.

After the performed adjustment of the reflector 10, the indicating element 50 is pressed downwardly in direction of the arrow 60 in FIG. 4, so that its threaded shell 51 is pressed onto the threaded shaft 37 and the threaded connection of the indicating element 50 with the adjusting screw 30 is produced. For pressing the indicating element 50, its head 54 can be engaged manually or by an automatic device. During pressing of the threaded shell 51 the slot 56 somewhat expands elastically, so that the thickening 56 can pass through it downwardly. The threaded shell 51 springy expands during pressing onto the threaded shaft 37 and springs back with the arrangement on the threaded shaft 37. The edges which limit the opening on the periphery of the threaded shell 51 can move away from one another in the pressing direction 60 for providing an easier pressing onto the threaded shaft 37 without clamping. In the downwardly pressed position of the indicating element 50 shown in FIG.

its head 54 is arranged under the projection 59. Therefore the indicating element 50 is no longer blocked in direction of the longitudinal axis 34, but instead is displaceable in the slot 46. When the reflector 10 is adjusted, the indicating element 50 due to its threaded connection with the adjusting screw 30 is displaced in the slot 46 in direction of the longitudinal axis 35 and indicates, on its scale 55 in cooperation with the projection 59, a deviation of the adjustment of the reflector 10 from the prescribed position.

The pitch of the thread of the rear threaded shaft 37 of the adjusting screw 30 can be identical or different from the pitch of the front threaded shaft 31. The threads of the threaded shaft 31 and 37 of the adjusting screw 30 are preferably extend in the same direction, however they can be also of opposite direction. The threads of the rear threaded shaft 37 of the adjusting screw 30 and the threaded shell 51 can be a single thread or a double thread.

Alternatively to the above described embodiment of the headlight, the threaded shaft 37 of the adjusting screw 30 can be arranged inside the housing part 34 or inside the housing 12. Then the indicating element 50 can extend correspondingly through a slot 46 in an upper wall of the housing part 34 or the housing 12.

It will be understood that each of the elements described above, or two or more together, may also find a useful application in other types of constructions differing from the types described above.

While the invention has been illustrated and described as embodied in headlight for vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for a vehicle, comprising a reflector; a holder on which said reflector is adjustably supported; an adjusting device for adjustment of said reflector, said adjusting device including an adjusting screw which is rotatable about its longitudinal axis and which is non-displaceable in direction of said longitudinal axis; an indicating device which indicates a deviation of an adjustment of said reflector from a prescribed position, said indicating device having an indicating element which is screwable in a threaded shaft of said adjusting screw, said indicating element being non-rotatable but displaceable in directioin of said longitudinal axis of said adjusting screw, said indicating element having a springy, expandable threaded shell which is open over a part of its periphery and provided with an inner thread, said indicating element being pre-mounted on a part of said holder in a position which is separate from said adjusting screw and so that a threaded connection of said indicating element with said adjusting screw is performed by pressing said threaded shell transversely to said longitudinal axis of said adjusting screw on said threaded shaft, said indicating element being formed so that in its pre-mounted position it is blocked in direction of said longitudinal axis of said adjusting screw so that said indicating device indicates the prescribed adjustment of said reflector, and in its position in which said threaded connection with said adjusting screw is produced it is displaceable in direction of said longitudinal axis.

2. A headlight as defined in claim 1, wherein said indicating element has a part provided with a recess, said part of said holder having a projection which performs the blocking of said indicating element in said pre-mounted position by engaging said projection in said recess in said part of said indicating element, said projection being formed only in a region in which said indicating element is located is said pre-mounting position.

3. A headlight as defined in claim 2, wherein said projection is formed as a marking which together with said indicating element forms said indicating device, said indicating element having a part provided with a scale.

4. A headlight as defined in claim 1, wherein said holder has a wall part provided with a slot which extends in direction of said longitudinal axis of said adjusting screw, said indicating element being displaceably guided in said slot.

5. A headlight as defined in claim 4, wherein said indicating element with said threaded shell is formed as a one-piece element provided with a web which is guided in said slot, said indicating element also having a head which is connected with said web at a side of said wall part which is opposite to said threaded shell.

6. A headlight as defined in claim 1, wherein said indicating element is formed so that a pressing of said indicating element from its pre-mounted position into a mounting position of the headlight is performed substantially vertically downwardly.

* * * * *